United States Patent
Dittmar et al.

(10) Patent No.: US 9,140,303 B2
(45) Date of Patent: Sep. 22, 2015

(54) CAGE FOR A ROLLER BEARING AND ROLLER BEARING

(71) Applicants: Rico Dittmar, Schweinfurt (DE); Volker Wendt, Üchtelhausen/Zell (DE)

(72) Inventors: Rico Dittmar, Schweinfurt (DE); Volker Wendt, Üchtelhausen/Zell (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/458,703

(22) Filed: Aug. 13, 2014

(65) Prior Publication Data

US 2015/0049971 A1    Feb. 19, 2015

(30) Foreign Application Priority Data

Aug. 14, 2013 (DE) .......................... 1 02013 216 109

(51) Int. Cl.
F16C 33/46 (2006.01)
F16C 33/66 (2006.01)
F16C 19/36 (2006.01)

(52) U.S. Cl.
CPC ............... *F16C 33/467* (2013.01); *F16C 33/46* (2013.01); *F16C 33/4635* (2013.01); *F16C 33/4676* (2013.01); *F16C 33/6629* (2013.01); *F16C 19/364* (2013.01); *F16C 33/6681* (2013.01)

(58) Field of Classification Search
CPC ............. F16C 33/6614; F16C 33/6629; F16C 33/6651; F16C 33/6681
USPC ......................................... 384/470, 572–580
See application file for complete search history.

(56) References Cited

U.S. PATENT DOCUMENTS

| | | | |
|---|---|---|---|
| 4,317,601 A * | 3/1982 | Faigley, Jr. ..................... | 384/576 |
| 2010/0098369 A1 * | 4/2010 | Reed et al. ..................... | 384/571 |
| 2012/0263405 A1 | 10/2012 | Mizuki et al. | |

FOREIGN PATENT DOCUMENTS

| | | |
|---|---|---|
| DE | 4207329 A | 10/1992 |
| DE | 10311566 A | 10/2003 |
| DE | 102009055660 A | 5/2011 |
| JP | 2005121097 A | 5/2005 |
| JP | 2009191940 A | 8/2009 |
| JP | 2010196808 A | 9/2010 |
| JP | 2012082916 A | 4/2012 |
| JP | 2012241828 A | 12/2012 |

* cited by examiner

*Primary Examiner* — Phillip A Johnson
(74) *Attorney, Agent, or Firm* — Bryan Peckjian; SKF USA Inc. Patent Dept.

(57) ABSTRACT

A cage for a roller bearing having a bearing axis extending in an axial direction, the cage including at least two crosspieces which extend between two axially spaced edges and are spaced from one another in a circumferential direction oriented perpendicular to the axial direction so that a rolling element can be disposed between them. At least one crosspiece of the at least two crosspieces has a first surface region that is a constant radial distance from the bearing axis, and the at least one crosspiece has a second surface region which is adjacent to the first surface region and includes a step along which the radial distance from the bearing axis varies.

20 Claims, 7 Drawing Sheets

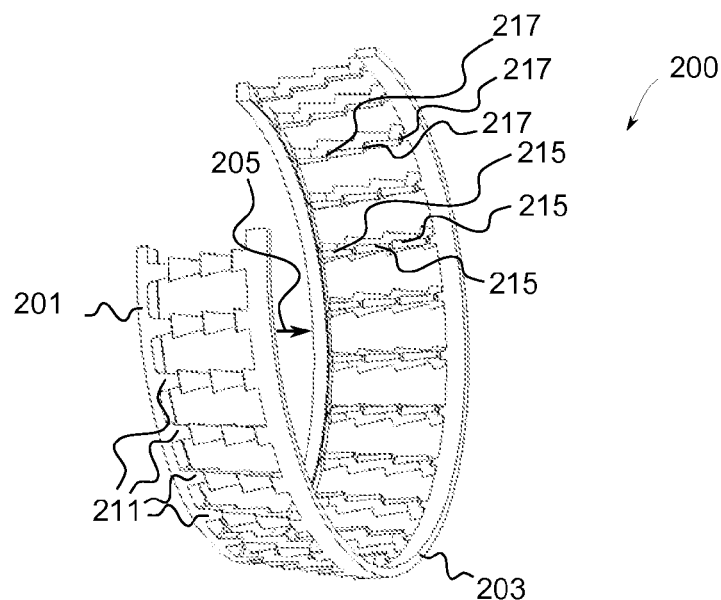
Fig. 4
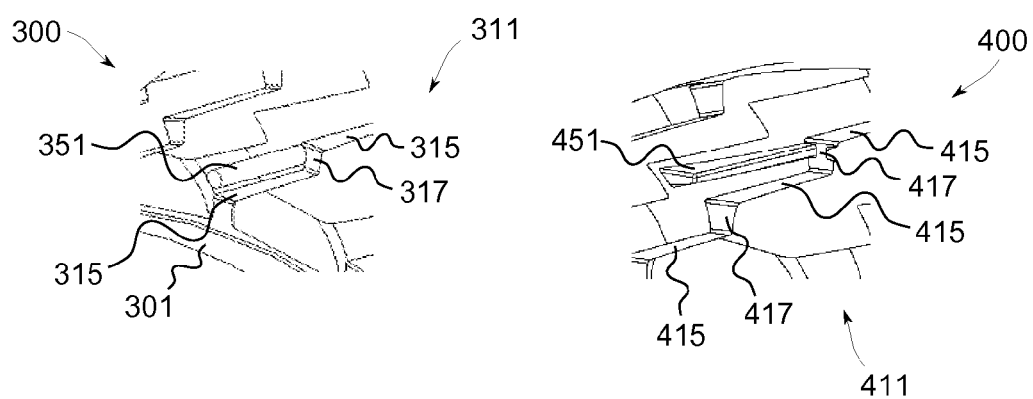
Fig. 5
Fig. 6

CAGE FOR A ROLLER BEARING AND ROLLER BEARING

CROSS-REFERENCE

This application claims priority to German patent application no. 10 2013 216 109.3 filed on Aug. 14, 2013, the contents of which are fully incorporated herein by reference.

TECHNOLOGICAL FIELD

The present disclosure is directed to a cage for a roller bearing and to a roller bearing including a cage, and, more specifically, to a tapered roller bearing including a cage.

BACKGROUND

Various conventional bearings are known, including sliding bearings, ball bearings, and roller bearings. The roller bearings can be further divided into cylindrical roller bearings, tapered roller bearings, needle bearings, and barrel roller bearings. A conventional tapered roller bearing comprises an inner ring having a roller bearing axis, an outer ring which is disposed around the inner ring, a cage between the inner ring and the outer ring, and a plurality of rolling elements retained in the cage between the outer ring and the inner ring. In tapered roller bearings, the rolling elements are conical and are aligned such that their rotational axes are inclined relative to the rotational axis of the bearing axis, that is, the rotational axes of the conical rolling elements are not parallel to the rotational axis of the bearing. Further, in tapered roller bearings, the cage has a small lateral ring or edge, a large lateral ring or edge and a plurality of bridges or crosspieces that extend from the small lateral ring to the large lateral ring and which are spaced in the circumferential direction.

Rotating the inner ring relative to the outer ring causes the conical rolling elements to rotate about their axes and revolve around the bearing axis. The rolling elements are spaced from one another in the circumferential direction by the crosspieces of the cage, and the rolling elements roll on both the inner ring and on the outer ring. To avoid or reduce friction, in particular rolling friction and/or sliding friction between the rolling elements and the outer ring or the inner ring as well as relative to the cage, a lubricant is conventionally applied to various contact surfaces of the bearing.

A conventional cage for a tapered roller bearing has an inclined (relative to the bearing axis) or oblique arrangement of crosspieces that extend between the rolling elements or rollers, in accordance with the conically formed raceways, and the tapered rollers which are inclined relative to the bearing axis. During operation of tapered rollers, it has been observed that only a limited amount of grease or lubricant can be retained on the cage crosspieces. This is because, during operation, the grease or lubricant tends to be pumped by centrifugal force to the large edge or lateral ring of the cage which has a greater diameter than the small edge or lateral ring of the cage. Due to this unwanted pumping of lubricant out to the large edge of the cage, the lubricant is not available on the crosspieces in sufficient quantity to perform a principal function of the lubricant, namely to lubricate the rollers, and the cage does not adequately dispense the lubricant onto the outer surface of the rollers. Therefore, in conventional tapered roller bearings, this function can not always be performed satisfactorily or completely.

Conventional efforts to address this problem involve using greater quantities of grease or other lubricant. However, this disadvantageously leads to increased lubricant churning, and it is generally desirable to reduce lubricant churning. It has been found to be difficult to achieve adequate lubrication without unduly increasing lubricant churning.

SUMMARY

It is an object of the present disclosure to provide a cage for a roller bearing, in particular for a tapered roller bearing, and a roller bearing that includes the cage, in which reliable lubrication is possible using an amount of lubricant that keeps lubricant churning at an acceptable level. Furthermore it is an object of the present disclosure to effectively use a lubricant in a roller bearing and to reduce a loss of lubricant during operation, in particular in order to thus also reduce losses due to churning.

According to an embodiment of the present disclosure, a cage is provided for a roller bearing that has a bearing axis extending in an axial direction. The cage includes at least two crosspieces which are spaced from each other in a circumferential direction oriented perpendicular to the axial direction, so that a rolling element, in particular a conical rolling element, can be disposed between them. At least one crosspiece (or in particular each crosspiece of the cage) has a first surface region (which is not outwardly exposed and which can have a radially inner section and/or a radially outer section), that is characterized by having a constant radial distance from the bearing axis (of the roller bearing). The at least one crosspiece furthermore advantageously has a second surface region adjacent to the first surface region and that is characterized by having a step such that the radial distance from the bearing axis (of the roller bearing) to the second surface varies. The step can also advantageously be formed with a rounded portion.

The axial direction is a direction parallel to the bearing axis of the roller bearing. The radial distance is measured from the bearing axis by dropping a perpendicular onto the bearing axis. A rolling-element axis of the rolling element is not parallel to the bearing axis, but rather is inclined with respect to the bearing axis, in particular at an angle of between about 5° and 45°. The rolling elements may have a conical structure. The cage may have a first edge or lateral ring and a second edge or lateral ring, which edges or lateral rings have different diameters. During operation the at least two crosspieces hold the rolling elements that are disposed between them.

The first surface region of the crosspiece can be described by surface points that are all a constant radial distance from the bearing axis. The first surface region is thus parallel (in particular from inside and, possibly, from outside) to the bearing axis, and in particular is not inclined relative to the bearing axis. The lubricant, in particular grease, can thus advantageously be retained or collected on the first surface region during operation of the bearing without it flowing along an incline towards the larger edge of the cage. An outflow of a lubricant can thus be reduced, and in turn, a required total amount of lubricant or grease can be reduced, while still ensuring reliable lubrication. In particular, due to the presence of the first surface region, centrifugal forces do not cause grease to be transported along the crosspieces. Instead, the grease can remain on the constant-diameter first surface region, or even, in some cases, be pumped toward the smaller lateral ring of the cage.

To encourage pumping toward the smaller lateral ring, the first surface region may be inclined such that lubricant can flow by centrifugal force towards the smaller ring. In this way a lubricant transport towards the larger lateral ring caused by a conical shape of the rolling elements can be actively counteracted.

According to a further preferred exemplary embodiment, it is advantageous, in particular with an active guiding of lubricant towards the small lateral ring, to form at least one recess on the smaller ring. Lubricant which has been pumped towards the small lateral ring can escape via this recess from a bearing inner region into a bearing outer region, and from there can be pumped radially outward towards the large lateral ring and lubricate the rolling elements in the process.

Furthermore the crosspiece of the cage, also referred to below as a "cage crosspiece," is stepped/tiered/staggered, because the cage is delimited by two edges or lateral rings that have different diameters. The first surface region can either be present on a radial outer surface of the crosspiece, or on a radially inner surface of the crosspiece, or even on a surface of the of the crosspiece that is oriented in the circumferential direction.

Due to the different diameters of the two edges or lateral rings of the cage, the crosspiece has a second surface region which is characterized by a step, and in this second surface region, the radial distance to the bearing axis or cage axis varies. Thus the radial distance from different points on the second surface region to the bearing axis varies. The step can be an abrupt step, so that the radial distance from the bearing axis varies abruptly at the step when axially spaced surface points of the second surface region are considered. Alternatively the step may comprise a slope so that the radial distance from different points on the step to the bearing axis varies continuously (in particular linearly) depending on an axial position. The step makes possible a varying of the diameter of the change when different axial positions are considered. The cage is thus suitable for a tapered roller bearing. Furthermore, in particular, pockets can be provided in order to make possible lubricant retention or lubricant circulation.

According to an embodiment of the present disclosure, the crosspieces have at least one further first surface region which is characterized by a further constant radial distance from the bearing axis, which is different from the constant radial distance of the first surface region. In one embodiment the crosspiece can further have at least one further second surface region which is adjacent to the further first surface region and is characterized by a further step, along which step the radial distance from the bearing axis varies. This configuration provides a plurality of first surface regions on the crosspiece at different axial positions which makes possible a receiving or retaining of lubricant at different axial regions. An outflow of lubricant can thus be further advantageously reduced in order to make possible or improve lubrication even with moderate total lubricant amounts, while lubricant churning is simultaneously reduced.

According to an embodiment of the present disclosure, the sum of the axial extensions of the first surface region and of the at least one further first surface region is between 15% and 100% of a total axial extension of the cage. A significant portion of the cage or of the respective crosspieces can thus be characterized by such a constant-diameter region or by a plurality of constant-diameter regions (regions which have a constant radial distance from the bearing axis), and this can improve lubricant retention. In particular, the number of first surface regions may be 1, 2, 3, 4, 5, 6, or 7 to 15 first surface regions, which are each characterized by having a constant radial distance from the bearing axis. Here a number and/or axial extension of first surface regions can be optimally chosen or defined based on a total extension in the axial direction of the cage and/or an inclination angle or a conicity or a conical angle.

According to an embodiment of the present disclosure, the first surface region and/or the at least one further first surface region forms a radially outer or radially inner surface of the crosspiece, and/or the second surface region and/or the at least one further second surface region forms an angle between 90° and 140° relative to the first surface region and/or to the at least one further first surface region.

Whether formed as a radially outer surface or as a radially inner surface, the first surface region or the at least one further first surface region can advantageously be formed for receiving lubricant or grease during operation, since centrifugal forces cannot lead to an outflow of the lubricant. If the second surface region encloses an angle of 90° relative to the first surface region, an abrupt step is formed, while if the second surface region encloses an angle of >90° relative to the first surface region, a shallower step or a slope is formed along which the radial distance varies linearly or in any case continuously. It can be advantageous to form the step as an abrupt or steep step, because this further inhibits an outflow of lubricant or grease.

According to an embodiment of the present disclosure, the crosspieces have a third surface region adjacent to the second surface region, which third surface region forms a surface in the circumferential direction (wherein the circumferential direction is perpendicular to the axial direction and also perpendicular to the radial direction) and which surface has a depression (or notch or channel) extending in the axial direction for guiding and/or retaining lubricant, in particular grease. The depression can have a semicircular cross-section and can be suitable for guiding lubricants, in particular in a circuit. Retaining lubricant in this manner can in turn reduce an outflow of lubricant because the lubricant collects approximately within the depression and is at least partially retained therein. Alternatively, the lubricant can flow along the depression, in particular be guided or flow along the depression to make possible, for example, a flow circuit of lubricant.

According to an embodiment of the present disclosure, the cage also has two axially spaced edges or lateral rings, between which the two crosspieces extend, and the first edge or lateral ring has a first diameter and the second edge or lateral ring has a second diameter which is greater than the first diameter. In this embodiment, the first surface region may lie axially closer to the second edge than the third surface region, and the further first surface region may lie axially farther from the second edge than the third surface region. Grease or lubricant can collect in or on the first surface region and can then flow away from the second edge of the cage via the second surface region to the third surface region, or remain on the first surface region and, for example, be retained in the third surface region. Due to the two edges having different diameters, the cage can be used for a tapered roller bearing. The surface regions can also have an opening to the first edge and/or to the second edge, which opening or openings facilitate the circulation of lubricant.

According to an embodiment of the present disclosure, the cage also has a fourth surface region which forms a surface of the crosspiece in the circumferential direction and can function as a scraping edge or wiping edge for scraping/wiping lubricant from the rolling element. The crosspiece can have a minor symmetry with respect to a minor plane so that the scraping edge can thus be present on both circumferential surfaces of the crosspiece, wherein the scraping edge is in contact on the one side with a rolling element which moves from radially outward towards and against the scraping edge, while the scraping edge on the other circumferential surface is in contact with a rolling element which moves from radially inward away from the scraping edge. The scraping edge can in particular lie radially outside or radially farther outward than a respective rolling-element axis. Using the scraping edge, lubricant or grease can be advantageously scraped away from the rolling element and then, for example, reach the first surface region (and/or a seventh surface region described below). For this purpose the fourth surface region can advantageously be oblique with respect to a rolling-element axis, so that the transport of the lubricant towards the other surface regions can be further enhanced. In particular, grease can be moved from the outer ring along the cage and pulled between the cage and the roller by the scraping edge in order to improve lubrication. Furthermore, grease can be moved from the inner ring radially outward to the cage, and transported from the large end (or first surface region) into a pocket (which is formed in particular by the third surface region). In particular, the grease can be transported from the first surface region into the third surface region, where it can, for example, be retained or pumped further.

According to an embodiment of the present disclosure, the cage also has a radially inner fifth surface region on (or close to) the second edge, which is formed as a conical trough, such that the fifth surface region, viewed in section along the circumferential direction, is described by a line inclined relative to the bearing axis in a direction opposite to the inclination of the rolling-element axis. Here the fifth surface region can make it possible to supply an end surface of the rolling element with lubricant at the second edge, which can flow on the fifth surface region out to the end surface. In particular, this fifth surface region can also comprise a retaining section which extends outside the axial extension of the rolling element, such that the distance of the retaining section from the rotational axis of the bearing at least sectionally decreases progressively towards the rotational axis of the bearing and away from the rolling elements. This forms a collecting channel in the axial region between a guide section and the retaining section. Due to the fifth surface region, grease can be pumped from a radially inward location to a radially outward location and accumulate on an end surface of the rolling element to reduce sliding friction there.

According to an embodiment of the present disclosure, the cage further has a sixth surface region, in particular adjacent to the second surface region, which sixth surface region forms a radially-inner surface and is inclined in the same direction relative to the bearing axis as the rolling-element axis (but not necessarily by the same angle). This sixth surface region can advantageously transport a grease or lubricant to the first surface region or the third surface region during operation.

The cage can further have a seventh surface region which preferably lies radially farther outward than the fourth surface region and that has a further depression (or channel or notch) extending in the axial direction for guiding and/or retaining lubricant. This depression can further form a part of a flow path of the lubricant during lubricant transport.

A flow of the lubricant along the different surface regions of the cage can be made possible so that the lubricant initially flows on the radially inner surface regions of the second edge along an axial direction to the first edge, is transported radially outwards at the first edge, and then transported in a radially outer surface region or in radially outer surface regions from the first edge of the cage to the second edge of the cage, in particular at least approximately along the axial direction. Furthermore the lubricant can flow to at least the end side of the rolling element which is disposed at the second edge of the cage. In this way lubrication can be ensured without having to provide an excessive amount of lubricant.

According to another embodiment, a cage is provided for a tapered roller bearing that has a bearing axis extending in an axial direction. The bearing axis lies in a plane that bisects the cage, and the cage includes a first lateral end having a first diameter, a second lateral end having a second diameter less than the first diameter, and first and second crosspieces extending from the first lateral end to the second lateral end and defining a pocket for receiving a tapered rolling element/ The first crosspiece includes a first wall parallel to the plane and a second wall that is not parallel to the plane.

According to an embodiment of the present disclosure, a roller bearing, in particular a tapered roller bearing, is provided with an outer ring, an inner ring, a cage according to one of the above-mentioned embodiments which is disposed between the outer ring and the inner ring, and provided with at least one rolling element, in particular a tapered rolling element, which is disposed between the two crosspieces.

BRIEF DESCRIPTION OF THE DRAWINGS

Exemplary embodiments of the disclosure will now be described with reference to the accompanying drawings. The disclosure, however, is not limited to the embodiments illustrated or described.

FIGS. 4, 5, and 6 illustrate further embodiments of a cage for a roller bearing according embodiments of the present disclosure.

DETAILED DESCRIPTION

Figure 1:
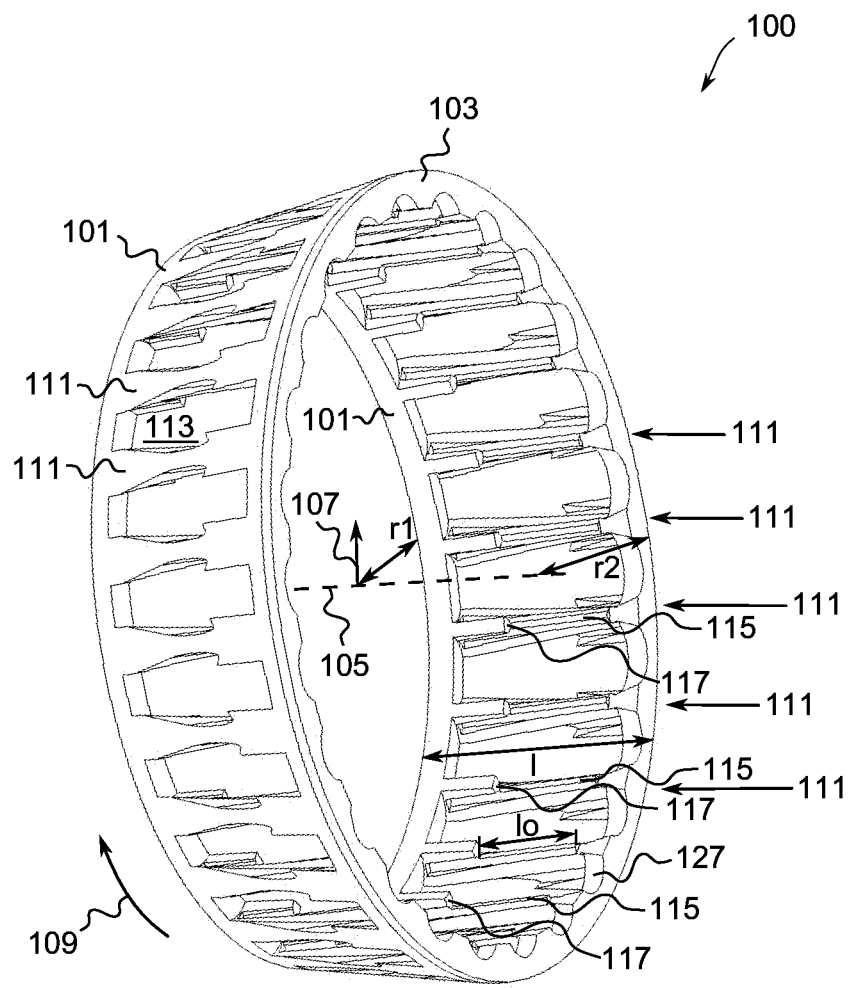
FIG. 1 is a perspective view of a cage for a roller bearing according to an exemplary embodiment of the present disclosure.

Various exemplary embodiments will now be described in more detail with reference to the accompanying drawings wherein some exemplary embodiments are shown. In the Figures, the thickness dimensions of lines, layers, and/or regions may be exaggerated for the sake of clarity.

In the following description of the accompanying figures, which merely illustrate exemplary embodiments, identical reference numerals can indicate identical or comparable components. Furthermore, summarizing reference numerals may be used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

Although exemplary embodiments can be modified and changed in various ways, exemplary embodiments are depicted in the Figures as examples and are described in detail herein. It should be clarified that it is not intended to limit exemplary embodiments to the respective disclosed forms, but rather that exemplary embodiments should cover all functional and/or structural modifications, equivalents, and alternatives which fall within the scope of the disclosure. Throughout the figures, identical reference numerals indicate identical or similar elements.

It should be observed that an element which is referred to as being "connected" or "coupled" to another element can be directly connected or coupled to the other element, or further elements can be present in between the connected or coupled elements. However, if an element is referred to as "directly connected" or "directly coupled" to another element, no elements are present between the connected or coupled elements. Other terms which are used to describe the relationship between elements should be interpreted in a similar manner (e.g., "between" in contrast to "directly between," "adjacent" in contrast to "directly adjacent," etc.)

The terminology used herein serves only to describe certain exemplary embodiments and is not intended to limit the exemplary embodiments. As used herein, the singular forms "a," "an," and "the" are also intended to include the plural forms unless the context clearly indicates otherwise. It should also be clarified that terms such as, e.g., "includes," "including," "has," and/or "having," as used herein indicate the presence of named features, whole numbers, steps, workflows, elements, and/or components, but the presence or the addition of one or one or more features, whole numbers, steps, workflows, elements, components and/or groups are not excluded by these terms.

Unless otherwise defined, all terms used herein (including technical and scientific terms) have the same meaning as would be understood by a person of ordinary skill in the art to which the exemplary embodiments belong. It should further be clarified that terms such as those which are defined in generally used dictionaries should be interpreted as though they had the meaning which is consistent with their meaning in the context of the relevant art, and not be interpreted in an idealized or overly formal sense, unless that is expressly defined herein.

FIG. 1 illustrates in perspective a cage 100 for a roller bearing according to an embodiment of the present disclosure that has a first edge or lateral ring 101 and a second edge or lateral ring 103. The second edge 103 has a greater diameter (or radius measured from a bearing- or cage axis 105) than the first edge 101. The bearing axis 105 defines an axial direction, and a radial direction 107 is perpendicular to the axial direction 105 and perpendicular to a circumferential or tangential direction 109.

The cage 100 further includes a plurality of crosspieces 111 extending generally in the axial direction between the first lateral ring 101 and the second lateral ring 103, which crosspieces 111 are spaced from one another in the circumferential direction 109 so that a conical rolling element (not illustrated in FIG. 1) can be disposed in an opening or empty space 113 between two of the crosspieces 111. The crosspieces 111 each have a first surface region 115 on their radially inner sides which forms a radially inner surface and has a constant radial distance from the bearing axis 105. That is, the first surface regions 115 extend substantially parallel to the bearing axis 105. Furthermore, the crosspieces have a second surface region 117 which is adjacent to the first surface region 115 and comprises a step or forms a step at which the radial distance of the crosspiece inner side to the bearing axis abruptly varies (decreases). In particular, the first edge or lateral ring 101 has a first radius r1 which is smaller than the second radius r2 of the second edge or lateral ring 103. Due to the second surface region 117, which is formed as a step, the radius increases, starting from the first edge 101, from the first radius r1 to the second radius r2 of the second edge 103. In other embodiments the crosspieces 111 can have further first surface regions and can also have further second surface regions, so that a plurality of regions having constant radial distance from the bearing axis can be separated from one another by a plurality of steps. An axial extension of the cage is indicated in FIG. 1 by reference number/symbol 1 and an axial extension of the first surface region 115 is indicated by reference number/symbol 1o. Here 1o is approximately 50% of 1. The cage illustrated in FIG. 1 has further surface regions which will be described with reference to FIGS. 2 and 3.

Figure 2:
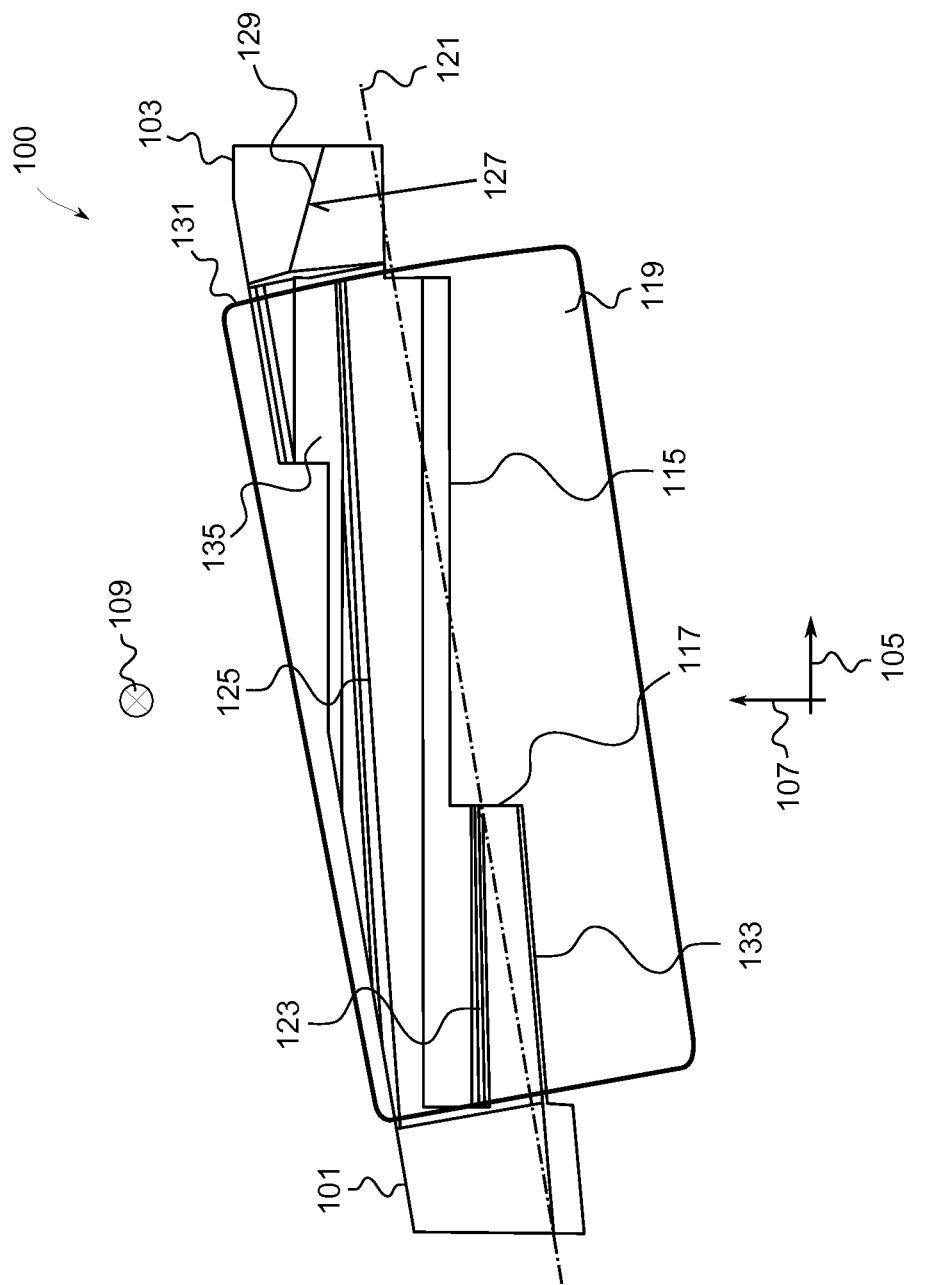
FIG. 2 is a sectional view (radial section) along a circumferential direction of the cage of FIG. 1, together with a rolling element.

FIG. 2 illustrates, in sectional view in the circumferential direction 109, a part of the cage 100 which is illustrated in FIG. 1, and a rolling element 119 disposed between two adjacent crosspieces 111. The rolling element 119 has a rolling-element axis 121 which forms an angle with the roller bearing axis 105 of between about 5° and 30° in this embodiment. Other angles are possible. The rolling element 119 is conical and has a smaller diameter near the first lateral ring 101 than near the second lateral ring 103. The cage 100 or crosspiece 111 has, in addition to the first surface region 115 and the second surface region 117, a third surface region 123 which is adjacent to the second surface region 117 and forms a surface in the circumferential direction (which is facing the viewer in FIG. 2). Furthermore, the third surface region 123 has a depression (e.g. channel-shaped groove) extending in the axial direction 105 for guiding and for retaining lubricant. The first surface region 115 is axially closer to the second edge 103 than the third surface region 123.

Furthermore, the cage 100 or crosspiece 111 has a fourth surface region 125 above (radially outward of) the first surface region 115, which fourth surface region 125 forms a surface of the crosspiece 111 in the circumferential direction and functions as a scraping edge for scraping lubricant from the rolling element 119. As can be seen in FIG. 2 as well as in FIG. 1, the cage also has a fifth surface region 127 which forms a surface in the circumferential direction and is formed as a conical trough, the fifth surface region 127 being formed near or on the side of the cage which is associated with the second edge 103. The fifth surface region is delimited by a line 129 in the sectional view illustrated in FIG. 2 when viewed in the circumferential direction; the line 129 is inclined relative to the bearing axis 105 in a direction opposite to the inclination of the rolling-element axis 121. The fifth surface region 127 may supply an end surface 131 of the rolling element 119, which is disposed at the second lateral ring 103, with lubricant, and the lubricant can flow (e.g., due to centrifugal force) via the fifth trough- or groove-shaped lateral surface region 127 of the crosspiece 111 onto the end surface 131 of the rolling element 119.

Furthermore, the cage 100 or crosspiece 111 has a sixth surface region 133 which is axially adjacent to the second surface region 117 and which forms a radially inner surface of the crosspiece 111 and which is inclined in the same direction relative to the bearing axis 105 as the rolling-element axis 121. In addition, the cage 100 has a seventh surface region 135 which forms a surface in the circumferential direction which lies radially farther outward than the fourth surface region 125 and has a further depression (e.g. channel-shaped groove), extending in the axial direction 105, for guiding and/or retaining lubricant.

Figure 3:
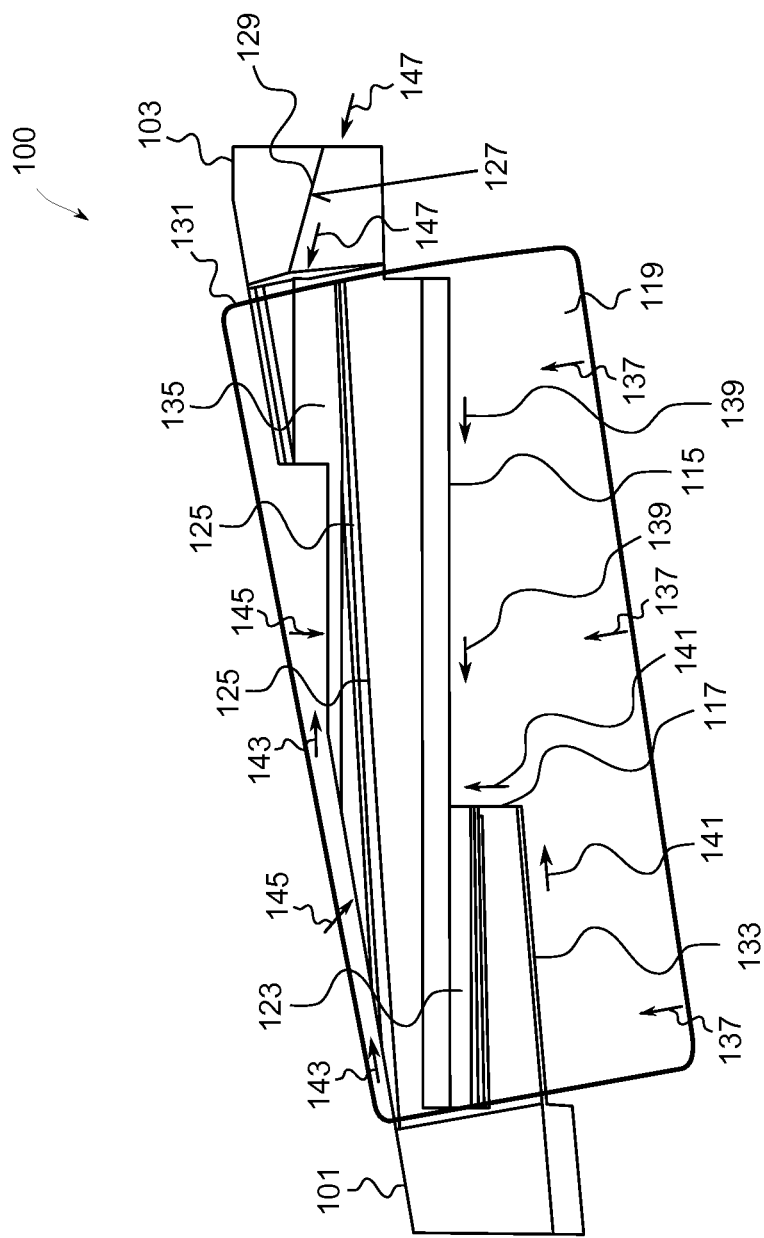
FIG. 3 schematically shows a perspective view of the cage of FIG. 2 viewed in a circumferential direction.

FIG. 3 illustrates the cage 100 or crosspiece 111 in a perspective view, but otherwise depicted in the same orientation and viewing direction as in FIG. 2. In this Figure the channel shape of the depressions of the third surface region 123 and of the seventh surface region 135 are more readily apparent. Lubricant can be guided or pumped along these depressions or retained on an end surface of the crosspiece 111 that faces in the circumferential direction. It is also possible to provide an opening from these grooves to the ring region which can be useful or effective to obtain and/or generate a lubricant circuit. In addition, arrows are included in FIG. 3 which depict flow directions of lubricant. The arrows 137 illustrate a movement of lubricant from a not-illustrated inner bearing ring out to the cage where the lubricant is collected in the first surface region 115. From there, the lubricant can be pumped along the arrows 139 into the depression of the third surface region 123, and can also arrive along the arrows 141 of the sixth surface region 133 from in or on the third surface region 123. Lubricant is moved from the (not illustrated) outer ring along the cage 100 along the direction of arrows 143 and pulled between the cage and the rolling element, as also indicated by arrows 145, by the scraping edge, scraping chamfer or scraping bevel 125. Lubricant is pulled along the fifth surface region 127 from below the cage into a gap between the end surface 131 of the rolling element 119 along the arrows 147.

FIG. 4 illustrates a cage 200 including crosspieces 211 according to another embodiment, wherein the cage 200 or the crosspieces 211 have a plurality of first surface regions 215 which are each separated by a second surface region 217 which forms a radial step. Other embodiments can have more or fewer radial steps.

FIG. 5 illustrates a sectional view of a cage 300 including crosspieces 311 according to another exemplary embodiment, in which a plurality of first surface regions 315 are formed that are separated by at least one second surface region 317. A retaining structure 351 can be provided axially and/or radially outward of the first surface region 315 in order to retain lubricant on or in the first surface regions 315.

FIG. 6 illustrates a detail view or partial view of a cage 400 including crosspieces 411 according to a further embodiment of the present disclosure. The cage includes crosspieces 411 having first surface regions 415 which are separated by second surface regions 417. The first surface regions 415 have a constant radial distance from a not-illustrated bearing axis, while the second surface regions 417 have a varying radial distance due to a step being formed in the radial direction. Furthermore a retaining structure 451 is illustrated which is disposed above or radially outward of a first surface region 415 in order to retain lubricant or grease in a reservoir which is formed between the first surface region 415 and the retaining structure 451.

Figure 7:
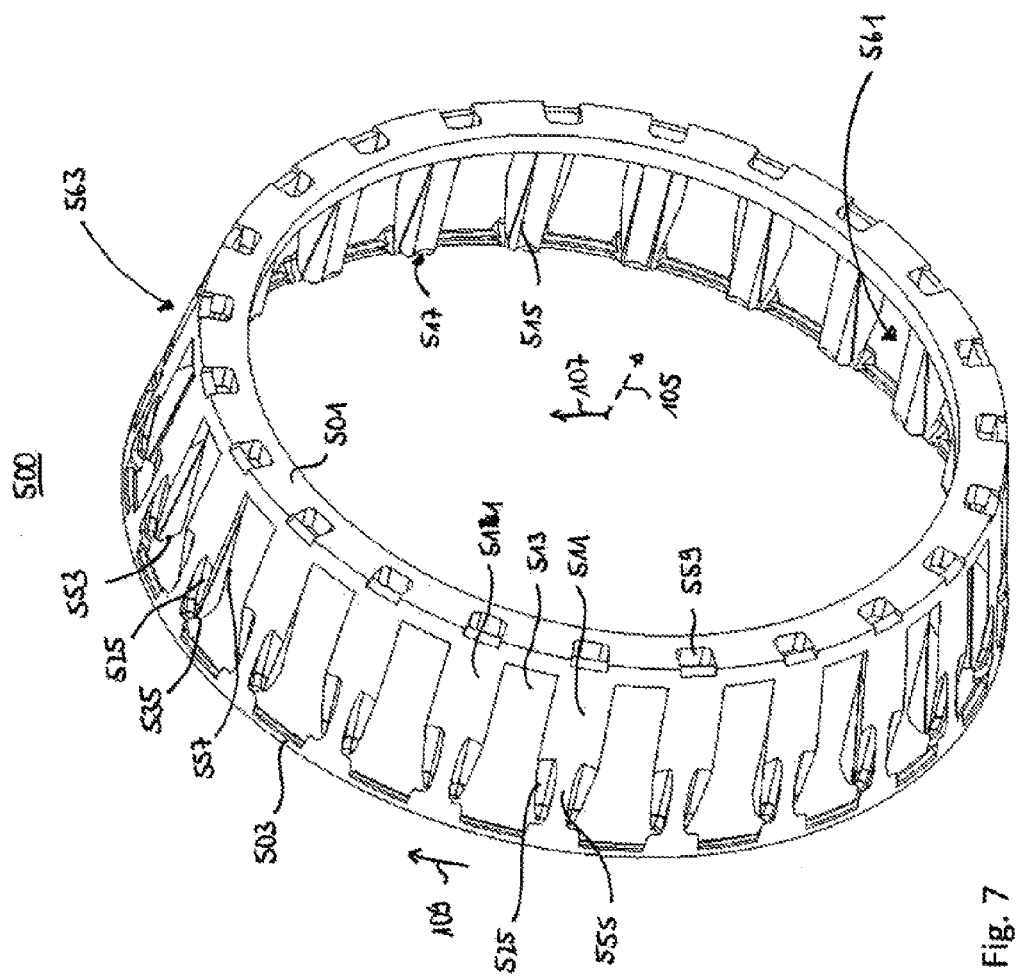
FIG. 7 is a perspective view of a cage for a roller bearing according to a further embodiment.

FIG. 7 illustrates a cage 500 including crosspieces 511 according to a further embodiment, where the cage 500, as in FIG. 1, has a first edge or lateral ring 501 and a second edge or lateral ring 503, and where the second edge 503 has a greater diameter (or radius measured from a bearing or cage axis 505) than the first edge 501. The cage 500 further includes crosspieces 511 which have a first surface region 515 and a second surface region 517 that is adjacent to the first surface region 515. The second surface region 517 has a step or forms a step. In contrast to the exemplary embodiment depicted in FIG. 1, however, in the exemplary embodiment shown in FIG. 7 the first surface 515 extends almost out to the larger lateral ring 503 and has the gradation only in this region. In addition, the edge of the step is rounded with a rounding/curvature 553. The first surface region 515 also has a scraping edge 557. In addition, in FIG. 7 the fourth surface region 525 extends obliquely to a surface 555 of the crosspiece 511 and merges into the seventh surface region 535 which is formed as a channel-shaped groove. Furthermore, recesses 559 are formed in the smaller lateral ring which allows for a connection between a cage inner region 561 and a cage outer region 563.

The functionality and the interaction of the surface regions and the recesses is especially clear when lubricant transport in the bearing is considered. This is explained below with reference to FIGS. 8 and 9, wherein FIG. 8 shows a partial view of the cage including a rolling element 519 supported in the opening 513; the rolling element 519 is not depicted in FIG. 9.

Figure 8:
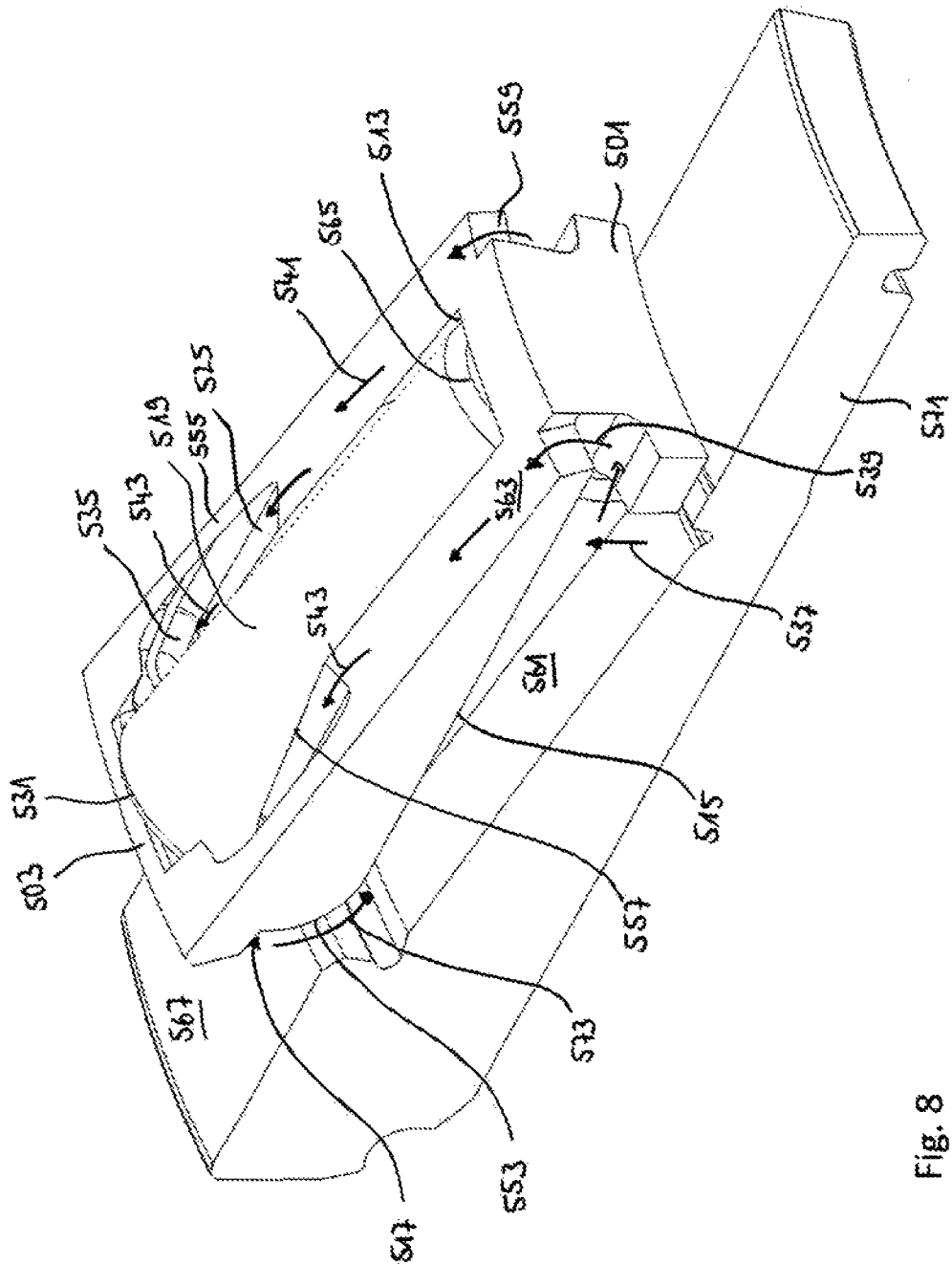
FIGS. 8 and 9 are partial views of the cage depicted in FIG. 6, with and without rolling elements.

As can be seen in FIG. 8, lubricant which is present on the rolling element 519 is scraped by the scraping edge 557 of the first surface region 515. However, since the first surface region 515 is set an angle to a rotational axis D of the rolling element, lubricant which is scraped on the scraping edge 557 from a rolling element is transported towards the smaller lateral ring 501. At the small lateral ring 501 the lubricant enters the recess 559 and is guided from the cage inner region 561 into the cage outer region 563. The recess 559 can also be embodied as an open groove. Alternatively or additionally the entire lateral ring 501 can be radially thinner, without a radial barrier. The lubricant course in this region is depicted by the arrows 537, 539, the lubricant again reaching the rolling elements 519, in particular their end sides 565. Furthermore, the lubricant in the outer region 563 is guided towards the fourth surface region 525 (see arrows 541), which in turn serves as a guiding surface, in order to lead lubricant into the seventh surface region 535 which is formed as a channel-shaped groove (see arrow 543). The seventh surface area 535 is in turn configured to transport lubricant onto an end side 531 of the rolling element 519.

Figure 9:
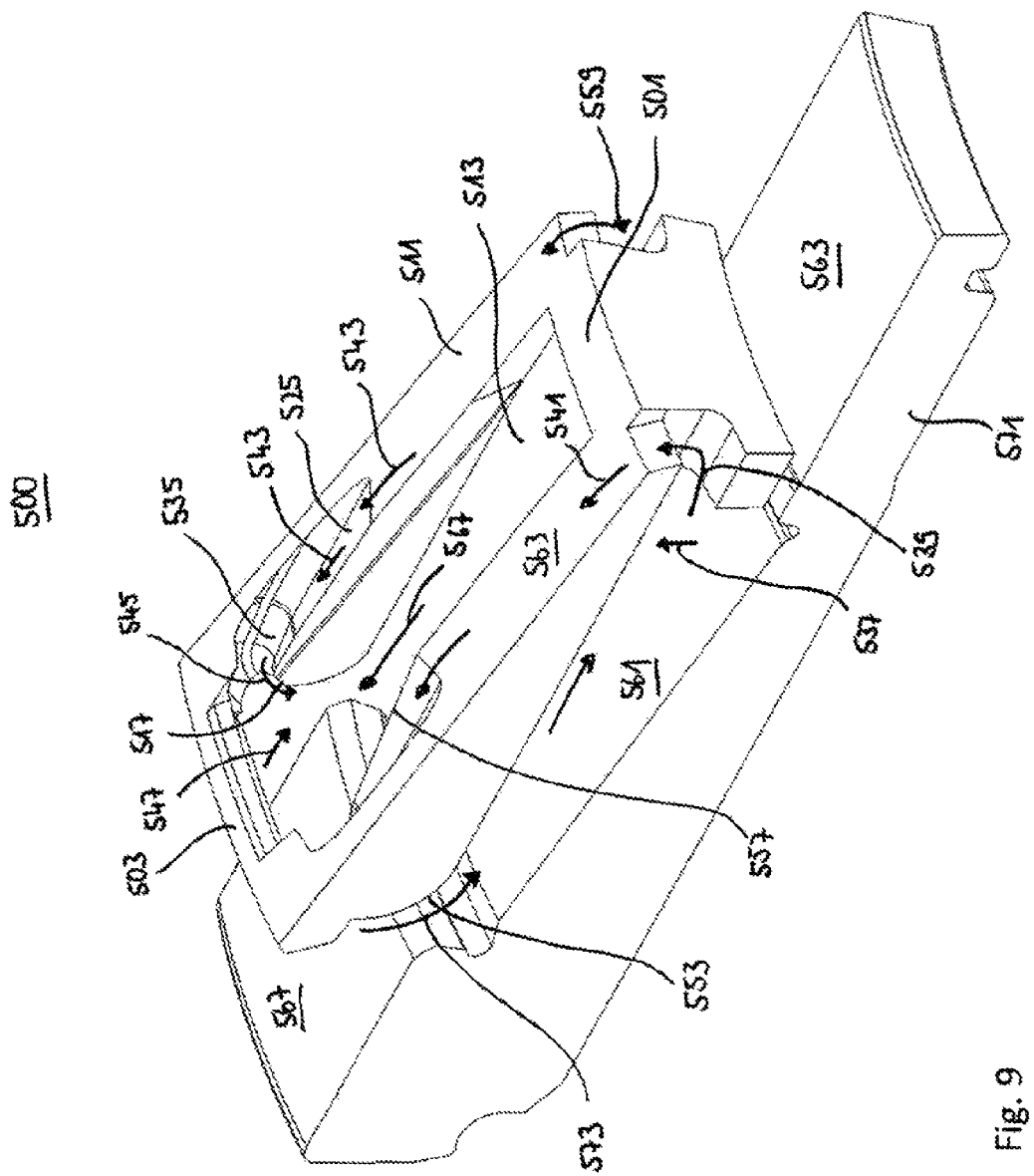

FIG. 9 shows the cage without a rolling element. The flow direction of the lubricant is also illustrated with arrows, in an analogous manner to FIG. 8. The arrows 537, 539 illustrate the movement of lubricant from the bearing inner region 561 via the recesses 559 into the outer region 563. From there the lubricant is pumped from the small lateral ring 501 towards the large lateral ring 503 (see arrows 541, 543), in particular into the channel-shaped groove 535. From there, as is also indicated by arrows 545, the lubricant is pulled between the cage 500 and the rolling elements 519. Arrow 547 indicates that the lubricant is also pulled from below the cage into a gap 567 by the end surface 531 of the rolling element 519. As a result, lubricant can be pumped back onto the rolling element 519 from a dead space region 569 which is formed outside the large lateral ring 503 between the inner ring 571 and the outer ring. Here the rounding 553 allows the lubricant to better flow along the arrow 573 towards rolling element 519 instead of accumulating on an edge.

In summary, exemplary embodiments thus suggest/propose a new cage design which can be manufactured in plastic or also in metal plate. The new cage design is characterized by a stepped embodiment of the cage crosspieces. In this way centrifugal forces can be prevented from causing grease transport along an oblique crosspiece, which in turn can reduce a grease loss from the raceway region into the lateral region. Instead, grease can remain on the straight, identical-diameter steps. The top side of the cage can also be available for grease retention due to the step shape if grease from the roller is scraped from an outer ring raceway onto the crosspiece top side. As a result, the amount of grease in the region between the rollers can be increased during operation of the bearing. The total amount of grease in the bearing can thereby be reduced in order to reduce losses due to lubricant churning, and a discharge of grease via adjacent seals can thereby also be reduced. This effect can be further increased by the use of a reservoir pocket, configurable in various designs, distributed among a plurality of crosspieces or among all crosspieces. Examples of these pocket shapes are presented in the figures in only a simple design.

Exemplary embodiments can contribute to improved lubrication of the rollers in the region of the outer surface of the roller. A locally more-intensive lubrication of the raceway contact is possible. Furthermore, a reduction in the amount of lubricant and/or a reduction of churning inside the bearing can be achieved. Exemplary embodiments also lead to lower heat generation and thus a longer grease life due to cooler operating temperatures.

The features disclosed in the foregoing description, the following claims, and the accompanying Figures can be meaningful and can be implemented both individually as well as in any combination for the realization of an exemplary embodiment in its various embodiments.

Although some aspects of the present invention have been described in the context of a device, it is to be understood that these aspects also represent a description of a corresponding method, so that a block or a component of a device is also understood as a corresponding method step or as a feature of a method step. In an analogous manner, aspects which have been described in the context of or as a method step also represent a description of a corresponding block or detail or feature of a corresponding device.

The above-described exemplary embodiments represent only an illustration of the principles of the present invention. It is understood that modifications and variations of the arrangements and details described herein will be clear to persons of skill in the art. It is therefore intended that the invention be limited only by the scope of the following patent claims, and not by the specific details which have been presented with reference to the description and the explanation of the exemplary embodiments.

REFERENCE NUMBER LIST 100, 200, 300, 400, 500 Cage
101, 501 First edge
103, 503 Second edge
105 Axial direction
107 Radial direction
109 Circumferential direction
111, 511 Crosspieces
113, 513 Opening between crosspieces
115, 215, 315, 415, 515 First surface region
117, 217, 317, 417, 517 Second surface region
119, 519 Rolling elements
121 Rolling-element axis
123 Third surface region
125, 525 Fourth surface region
127 Fifth surface region
129 Line of the fifth surface region
131 End surface of the rolling element
133 Sixth surface region
135, 535 Seventh surface region
137, 537, 139, 539,
141, 541, 143, 543,
145, 545, 147, 547, 573 Flow directions of lubricant
351, 451 Retaining structure
553 Rounding
555 Crosspiece surface
557 Scraping edge
559 Recess
561 Cage interior
563 Cage exterior
565 Rolling element end side
567 Gap
569 Dead space region
571 Inner ring

The invention claimed is:

1. A cage for a roller bearing having a bearing axis extending in an axial direction, the cage including:
   at least two crosspieces which extend between two axially spaced edges and are spaced from one another in a circumferential direction oriented perpendicular to the axial direction so that a rolling element can be disposed between them,
   wherein at least one crosspiece of the at least two crosspieces has a first radially inner surface region that is a constant radial distance from the bearing axis, and first and second side surfaces extending from the first and second circumferentially spaced sides of the first radially inner surface region toward an exterior of the cage, and
   wherein the at least one crosspiece has a second surface region which is adjacent to the first surface region and comprises a step along which the radial distance from the bearing axis varies.

2. The cage according to claim 1, wherein the step includes a rounded portion.

3. The cage according to claim 1, wherein at least one recess is formed on the first edge.

4. The cage according to claim 1, wherein the at least one crosspiece has at least one further first surface region that is a further constant radial distance from the bearing axis, the further constant radial distance being different from the constant radial distance of the first surface region, and/or
   wherein the at least one crosspiece has at least one further second surface region adjacent to the further first surface region and includes a further step along which the radial distance from the bearing axis varies.

5. The cage according to claim 4, wherein a sum of axial extensions of the first surface region and of the at least one further first surface region is between 50% and 100% of a total axial extension of the cage.

6. The cage according to claim 5, wherein the first surface region and/or the at least one further first surface region forms a radially outer or radially inner surface of the crosspiece and/or wherein the second surface region and/or the at least one further second surface region encloses an angle of between 90° and 140° relative to the first surface region and/or to the at least one further first surface region.

7. The cage according to claim 1, wherein the crosspiece has a third surface region adjacent to the second surface region, which third surface region forms a surface in the circumferential direction and which has a depression extending in the axial direction for guiding and/or retaining lubricant.

8. The cage according to claim 7, wherein the first edge has a first diameter, and the second edge has a second diameter which is greater than the first diameter, and
   wherein the first surface region lies axially closer to the second edge than the third surface region, and wherein the further first surface region lies axially farther from the second edge than the third surface region.

9. The cage according to claim 1, further having a fourth surface region which forms a surface of the crosspiece in the circumferential direction and functions as a scraping edge for scraping lubricant from the rolling element, wherein the fourth surface region is set at an angle to a surface of the crosspiece.

10. The cage according to claim 1, further having a sixth surface region, adjacent to the second surface region, which forms a radially inner surface and is inclined relative to the bearing axis in an identical direction as the inclination of the rolling-element axis.

11. The cage according to claim 1, further having a seventh surface region which is formed as a channel-shaped groove and has a depression extending in the axial direction for guiding and/or retaining lubricant.

12. A tapered roller bearing, comprising:
an outer ring;
an inner ring;
the cage according to claim 1 disposed between the outer ring and the inner ring, and;
at least one tapered rolling element disposed between the two crosspieces.

13. The cage according to claim 1,
wherein the step includes a rounded portion,
wherein at least one recess is formed on the first edge,
wherein the at least one crosspiece has at least one further first surface region that is a further constant radial distance from the bearing axis, the further constant radial distance being different from the constant radial distance of the first surface region,
wherein the crosspiece has a third surface region adjacent to the second surface region, which third surface region forms a surface in the circumferential direction and which has a depression extending in the axial direction for guiding or retaining lubricant,
wherein the first edge has a first diameter, and the second edge has a second diameter which is greater than the first diameter,
wherein the first surface region lies axially closer to the second edge than the third surface region, and wherein the further first surface region lies axially farther from the second edge than the third surface region,
the cage further including a fourth surface region which forms a surface of the crosspiece in the circumferential direction and functions as a scraping edge for scraping lubricant from the rolling element, wherein the fourth surface region is set at an angle to a surface of the crosspiece,
the cage further including a radially inner fifth surface region on the second edge which is formed as a conical trough,
wherein the fifth surface region in sectional view along the circumferential direction is described by a line which is inclined relative to the bearing axis in an opposite direction from the inclination of the rolling-element axis,
wherein the fifth surface region makes it possible to supply an end surface of the rolling element at the second edge with lubricant which flows on the fifth surface region to the end surface,
the cage further including a sixth surface region, adjacent to the second surface region, which forms a radially inner surface and is inclined relative to the bearing axis in an identical direction as the inclination of the rolling-element axis, and
the cage further including a seventh surface region which is formed as a channel-shaped groove and has a depression extending in the axial direction for guiding and/or retaining lubricant.

14. A cage for a tapered roller bearing having a bearing axis extending in an axial direction, the bearing axis lying in a plane that bisects the cage, the cage including:
a first lateral end having a first diameter,
a second lateral end having a second diameter less than the first diameter, and
first and second crosspieces extending from the first lateral end to the second lateral end and defining a pocket for receiving a tapered rolling element,
wherein the first crosspiece includes a rib projecting toward the bearing axis, the rib having a first wall parallel to the plane and wherein the first crosspiece includes a second wall that is not parallel to the plane.

15. The cage according to claim 14, wherein the first wall is spaced from the plane by a first distance and wherein the crosspiece includes a third wall parallel to the plane and spaced from the plane by a second distance different than the first distance.

16. The cage according to claim 14, including a third wall parallel to the plane and spaced from first wall by the second wall.

17. The cage according to claim 14, wherein the first crosspiece has a fourth wall adjacent to the second wall and extending circumferentially and including an axially extending depression configured to guide or retain a lubricant.

18. The cage according to claim 14, further having a fourth surface region which forms a surface of the crosspiece in the circumferential direction and functions as a scraping edge for scraping lubricant from the rolling element, wherein the fourth surface region is set at an angle to a surface of the crosspiece.

19. The cage according to claim 14, further having on the second edge a radially inner fifth surface region which is formed as a conical trough,
wherein the fifth surface region in sectional view along the circumferential direction is described by a line which is inclined relative to the bearing axis in an opposite direction from the inclination of the rolling-element axis, and
wherein the fifth surface region makes it possible to supply an end surface of the rolling element at the second edge with lubricant which flows on the fifth surface region to the end surface.

20. A cage for a roller bearing having a bearing axis extending in an axial direction, the cage including:
at least two crosspieces which extend between two axially spaced edges and are spaced from one another in a circumferential direction oriented perpendicular to the axial direction so that a rolling element can be disposed between them,
wherein at least one crosspiece of the at least two crosspieces has a first surface region that is a constant radial distance from the bearing axis, and
wherein the at least one crosspiece has a second surface region which is adjacent to the first surface region and comprises a step along which the radial distance from the bearing axis varies,
the cage further having on the second edge a radially inner third surface region which is formed as a conical trough,
wherein the third surface region in sectional view along the circumferential direction is described by a line which is inclined relative to the bearing axis in an opposite direction from the inclination of the rolling-element axis, and
wherein the third surface region makes it possible to supply an end surface of the rolling element at the second edge with lubricant which flows on the third surface region to the end surface.

* * * * *